United States Patent
Nam et al.

(10) Patent No.: US 10,547,092 B2
(45) Date of Patent: Jan. 28, 2020

(54) BATTERY CELL INCLUDING PHASE CHANGE MATERIAL

(71) Applicant: LG Chem, Ltd., Seoul (KR)

(72) Inventors: Gi Min Nam, Daejeon (KR); Jong Hun Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/755,379

(22) PCT Filed: Feb. 6, 2017

(86) PCT No.: PCT/KR2017/001275
§ 371 (c)(1),
(2) Date: Feb. 26, 2018

(87) PCT Pub. No.: WO2017/209371
PCT Pub. Date: Dec. 7, 2017

(65) Prior Publication Data
US 2018/0254533 A1    Sep. 6, 2018

(30) Foreign Application Priority Data
May 31, 2016   (KR) .......................... 10-2016-0067492

(51) Int. Cl.
*H01M 10/617* (2014.01)
*H01M 10/02* (2006.01)
(Continued)

(52) U.S. Cl.
CPC ....... *H01M 10/617* (2015.04); *H01M 2/0275* (2013.01); *H01M 2/1673* (2013.01);
(Continued)

(58) Field of Classification Search
CPC .................................................. H01M 10/659
See application file for complete search history.

(56) References Cited

U.S. PATENT DOCUMENTS

| | | | |
|---|---|---|---|
| 2002/0125860 A1* | 9/2002 | Schworm | H01M 2/105 320/150 |
| 2003/0031922 A1* | 2/2003 | Maleki | H01M 2/1094 429/120 |

(Continued)

FOREIGN PATENT DOCUMENTS

| | | |
|---|---|---|
| EP | 1406321 A2 | 4/2004 |
| EP | 2955771 A1 | 12/2015 |

(Continued)

OTHER PUBLICATIONS

Extended European Search Report including Written Opinion for EP17806864.9 dated May 14, 2018.

(Continued)

*Primary Examiner* — Robert S Carrico
(74) *Attorney, Agent, or Firm* — Lerner, David, Littenberg, Krumholz & Mentlik, LLP (57) ABSTRACT

The present invention provides a battery cell of a plate shape, including: an electrode assembly in which a separator is interposed between a positive electrode and a negative electrode, wherein the electrode assembly may be mounted on a receiving part; and sealing parts formed by heat fusion at an external side of the receiving part, wherein lateral sealing parts adjacent to one of the sealing parts at which an electrode terminal is positioned may closely contact an outer surface of the receiving part while being bent toward the receiving part of a battery case, and a phase change material (PCM) that is phase-changed in response to a thermal change may be added to surplus surfaces of the lateral sealing parts or to surplus spaces between the receiving parts and the bent lateral sealing parts.

15 Claims, 6 Drawing Sheets

(51) Int. Cl.
    *H01M 10/625* (2014.01)
    *H01M 10/615* (2014.01)
    *H01M 10/647* (2014.01)
    *H01M 10/613* (2014.01)
    *H01M 10/659* (2014.01)
    *H01M 2/16* (2006.01)
    *H01M 2/26* (2006.01)
    *H01M 2/02* (2006.01)

(52) U.S. Cl.
    CPC ............ *H01M 2/26* (2013.01); *H01M 10/02* (2013.01); *H01M 10/613* (2015.04); *H01M 10/615* (2015.04); *H01M 10/625* (2015.04); *H01M 10/647* (2015.04); *H01M 10/659* (2015.04); *H01M 2/0237* (2013.01); *H01M 2/0262* (2013.01); *H01M 2/0287* (2013.01)

(56) References Cited

U.S. PATENT DOCUMENTS

| | | |
|---|---|---|
| 2006/0063066 A1 | 3/2006 | Choi et al. |
| 2008/0286644 A1 | 11/2008 | Yeo |
| 2009/0305124 A1* | 12/2009 | Ahn .................... H01M 2/0277 429/120 |
| 2013/0071696 A1 | 3/2013 | Kim et al. |
| 2013/0344372 A1* | 12/2013 | Carkner ................ H01M 2/021 429/127 |

FOREIGN PATENT DOCUMENTS

| | | | | |
|---|---|---|---|---|
| JP | 2000268807 A | * | 9/2000 | .......... H01M 2/0202 |
| JP | 2001250515 A | | 9/2001 | |
| JP | 2002319375 A | | 10/2002 | |
| JP | 2004079468 A | | 3/2004 | |
| JP | 2004165134 A | | 6/2004 | |
| KR | 20040035410 A | | 4/2004 | |
| KR | 20060048991 A | | 5/2006 | |
| KR | 20070025418 A | | 3/2007 | |
| KR | 100870354 B1 | | 11/2008 | |
| KR | 100956397 B1 | | 5/2010 | |
| KR | 20120039469 A | | 4/2012 | |
| KR | 20140024600 A | | 3/2014 | |
| KR | 20160041402 A | | 4/2016 | |
| KR | 20160059165 A | | 5/2016 | |
| WO | 2012141191 A1 | | 10/2012 | |

OTHER PUBLICATIONS

International Search Report for PCT/KR2017/001275 dated May 19, 2017.

* cited by examiner

BATTERY CELL INCLUDING PHASE CHANGE MATERIAL

CROSS-REFERENCE TO RELATED APPLICATIONS

The present application is a national phase entry under 35 U.S.C. § 371 of International Application No. PCT/KR2017/001275, filed Feb. 6, 2017, published in Korean, which claims priority to and the benefit of Korean Patent Application No. 10-2016-0067492 filed in the Korean Intellectual Property Office on May 31, 2016, the disclosures of which are incorporated herein by reference.

TECHNICAL FIELD

The present invention relates to a battery cell including a phase change material.

BACKGROUND ART

One of serious problems with vehicles using fossil fuels such as gasoline and diesel is that they cause air pollution. As a method for solving such a problem, a technique of using a chargeable and dischargeable rechargeable battery as a power source for a vehicle has attracted attention. Accordingly, an electric vehicle (EV) capable of being operated only by a battery, a hybrid electric vehicle (HEV) using a battery and a conventional engine, and the like have been developed, and some of them have been commercially available. A nickel metal hydride (Ni-MH) battery is mainly used as a rechargeable battery corresponding to a power source for the EV, the HEV, and the like, and recently, use of a lithium ion battery has also been attempted.

In order to use such a rechargeable battery as the power source for the EV, the HEV, and the like, a rechargeable battery of high output and large capacity is required. To this end, a plurality of small rechargeable batteries (unit batteries) are connected in series and/or in parallel to form a battery module, and a plurality of battery modules are connected in parallel and/or in series to form one middle- or large-sized battery pack to be used.

However, the high power and large capacity rechargeable battery generates a large amount of heat during a charging or discharging process. When the heat of the unit battery generated during the charging or discharging process may not be effectively eliminated, heat accumulation occurs, resulting in deterioration of the unit battery. Further, there is a possibility that, when some of the unit batteries are overheated due to various causes in this process, ignition or explosion may occur. Therefore, a cooling system is indispensable in a middle- or large-sized battery pack of high power and large capacity.

The cooling of the middle- or large-sized battery pack is generally performed by convective heat transfer based on flow of a coolant. For example, a coolant-flow cooling system in which a coolant such as air is flowed between the unit batteries of the battery pack or between the battery modules by a cooling fan, is used. However, in such a system, a temperature deviation between the unit batteries is very large.

In addition to these problems, a vehicle such the EV, the HEV, and the like often operates under harsh conditions. Optimum operating conditions of the unit batteries included in the battery pack may vary depending on various factors, but are generally determined within a specific temperature range. Since the vehicle operates at a low temperature in winter, it is necessary to operate the battery pack in the optimum operating temperature range as described above. In this case, in order to perform a temperature increasing operation instead of the cooling, the operation of the cooling system may be stopped, or the temperature of the coolant (e.g., air) flowing into the cooling system may be increased. However, when the unit cell is in a very low temperature state before that, components of the battery may be damaged, and deterioration thereof may be promoted by a sudden temperature increasing operation.

As an attempt to solve the problems, in order to prevent an explosion risk of the battery due to a rapid temperature rise, a method in which a flame retardant material is included in some of the constituent elements of the battery or in which curing of an electrolyte is performed at a certain temperature or more has been developed. However, these methods may be used as methods for preventing explosion when the battery is in an abnormal operating state, but they are not techniques for suppressing an internal temperature rise, and further, they have a disadvantage that the battery is converted to an irreversible state so that it may no longer be used.

Therefore, there is a high need for a technique that is capable of prolonging cycle-life of the battery by suppressing the temperature rise inside the battery in a normal operating state or by at least lowering a rate of the temperature rise, and that is capable of further improving safety of the battery by suppressing a rapid temperature rise.

On the other hand, a technology of using a material having high latent heat for a specific purpose during phase change thereof is known. For example, a technology that provides a more comfortable environment by applying the material having the high latent heat to a garment and a room interior to induce a gentle temperature change in spite of a sudden external temperature change is known.

In addition, some technologies for applying the above-mentioned characteristics to a battery are also known. For example, in WO 03/061032, a method of putting a battery into a housing containing a material having high latent heat has been proposed in order to prevent a sudden rise in a temperature of a battery as a power source of a medical instrument for implantation to prevent adverse effects on the human body is provided.

However, this method has a limitation in that a temperature difference between individual rechargeable batteries may not be effectively controlled.

Therefore, there is a high need for a technology capable of fundamentally solving these various problems.

DISCLOSURE

Technical Problem

The present invention has been made to solve the above-mentioned problems of the prior art and conventional technical problems.

The inventors of the present application conducted intensive research and various experiments. As a result, it is confirmed that, as described later, when a phase change material (PCM) that is phase-changed in response to a thermal change is added to surfaces of sealing parts in a battery cell or to a surplus space between a receiving part and bent sealing parts, since it is possible to effectively suppress a sudden temperature change of the battery cell due to driving of a device and it is possible to control a temperature of the battery cell to an optimum operating temperature range of the battery cell under harsh conditions, cycle-life and safety of the battery cell may be improved. Thus, the present invention was accomplished.

Technical Solution

The present invention has been made in an effort to provide a battery cell of a plate shape, including: an electrode assembly in which a separator is interposed between a positive electrode and a negative electrode, wherein the electrode assembly may be mounted on a receiving part; and sealing parts formed by heat fusion at an external side of the receiving part,
wherein lateral sealing parts adjacent to one of the sealing parts at which an electrode terminal is positioned may closely contact an outer surface of the receiving part while being bent toward the receiving part of a battery case, and
a phase change material (PCM) that is phase-changed in response to a thermal change may be added to surplus surfaces of the lateral sealing parts or to surplus spaces between the receiving parts and the bent lateral sealing parts.

In this case, the PCM is a material that is phase-changed at a predetermined temperature, and specifically, the PCM may be a material having high latent heat when a phase change from a solid phase to a liquid phase or from a liquid phase to a solid phase occurs. The predetermined temperature at which the phase change occurs is in a range of 25° C. to 120° C., which is a range from a temperature close to an upper limit value of an optimal operating temperature range of the battery cell to a temperature that may degrade performance or cycle-life of the battery or may threaten safety thereof, and more specifically, the predetermined temperature may be in a range of 25° C. to 50° C.

The PCM may thermally contact the receiving part of the battery cell that is charged or discharged to absorb at least some of heat generated from the battery cell, or to discharge at least some of heat accumulated in the PCM to the battery cell.

Therefore, by adding the PCM that is phase-changed in response to a thermal change to the surfaces of the sealing parts in the battery cell or to the surplus space between the receiving part and the bent sealing parts, since it is possible to effectively suppress a sudden temperature change of the battery cell due to driving of a device and it is possible to control a temperature of the battery cell to an optimum operating temperature range of the battery cell under harsh conditions, cycle-life and safety of the battery cell may be improved.

In one exemplary embodiment, the lateral sealing parts may include at least one bent part in which some of the sealing part is bent to closely contact the outer surface of the receiving part.

In another exemplary embodiment, each of the lateral sealing parts may include a first bent part vertically upwardly bent at a position adjacent to the receiving part and a second bent part vertically downwardly bent at a position facing the first bent part while one of both surfaces of the battery cell of the plate shape is parallel to the ground, and an external end portion of the lateral sealing part may be positioned between the bent lateral sealing part and the receiving part to have a double-bent structure.

In a formation process of the double-bent structure, some of the external end portion spaced apart from the receiving part of the lateral sealing part may be bent toward the receiving part to form the second bent part, and then some other of the external end portion adjacent to the receiving part of the lateral sealing part may be bent to form the first bent part.

Such a structure may generally reduce an area and a volume of the battery cell to improve an energy density of the battery pack including the battery cell, and thus may be suitably applied to a middle- or large-sized battery pack requiring high power and large capacity.

In the present invention, the PCM may be added as a structure that is coated on a surface of the lateral sealing part forming an inner bent surface by the first bent part and the second bent part, and as described above, through the structure in which the lateral sealing parts are bent to closely contact the outer surface of the receiving part, the PCM may absorb at least some of heat generated from the receiving part of the battery cell, or to discharge at least some of heat accumulated in the PCM to the receiving part of the battery cell, thereby maintaining the temperature of the battery cell to be at a constant level.

The PCM may be coated on the surface of the lateral sealing part before the first bent part and the second bent part are formed.

The PCM may be coated on the surface of the lateral sealing part in some of the inner bent surface excluding portions in which the first bent part and the second bent part are bent.

Generally, in order to reduce an overall volume of the battery cell, a surplus space having a predetermined size is formed in the structure in which the lateral sealing parts are bent in a direction of the receiving part of the battery case to closely contact the outer surface of the receiving part.

Accordingly, in the present invention, the PCM may be coated on the surface of the lateral sealing part, and a PCM member having a size corresponding to the bent space formed at the lateral sealing part by the double-bent structure may be inserted into the bent surplus space.

In the structure, the PCM member may be fixed to the bending surplus space, for example, using an adhesive or an adhesive tape to be stably inserted into the bending surplus space.

In addition, as described above, since the bent surplus space is formed by the double-bent structure, the bent surplus space or PCM member may have a triangular shape in a vertical section, but is not limited thereto.

In one exemplary embodiment, a horizontal length of the bent surplus space or PCM member may be in a range of 0.3 mm to 1.0 mm, and a vertical length thereof may be in a range of 0.5 mm to 1.5 mm, and more specifically, the horizontal length of the bent surplus space or PCM member may be 0.3 mm, and the vertical length thereof may be 1.0 mm.

The PCM used in the present invention is not limited to a particular material, and may be a single compound material, a mixture material, or a complex material, and further, the phase change of these materials may be physically performed at the predetermined temperature, but also, a mixture of two or more materials may be phase-changed by a reversible physical or chemical reaction at the predetermined temperature.

The PCM may be at least one of an organic material-based PCM, an inorganic material-based PCM, and a paraffin-based PCM.

The organic material-based PCM may be at least one of, for example, an alkane having 11 to 50 carbon atoms, pentaerythritol, polyethylene, acetamide, propylamide, naphthalene, stearic acid, polyglycol E6000, wax, 3-heptatecanone, cyanamide, d-lactic acid, glycerol, acetic acid, ethylenediamine, and polyglycol E400.

The inorganic material-based PCM may be at least one of, for example, $MgCl_2 \cdot 6H_2O$, $Al_2(SO_4)_3 \cdot 10H_2O$, $NH_4Al$ $(SO_4)_2 \cdot 12H_2O$, $KAl(SO_4)_2 \cdot 12H_2O$, $Mg(SO_3)_2 \cdot 6H_2O$, $SrBr_2 \cdot 6H_2O$, $Sr(OH)_2 \cdot 8H_2O$, $Ba(OH)_2 \cdot 8H_2O$, $Al(NO_3)_2 \cdot 9H_2O$, $Fe(NO_3)_2 \cdot 6H_2O$, $NaCH_2S_2O_2 \cdot 5H_2O$, $Ni(NO_3)_2 \cdot 6H_2O$, $Na_2S_2O_2 \cdot 5H_2O$, $ZnSO_4 \cdot 7H_2O$, $CaBr_2 \cdot 6H_2O$, $Zn(NO_3)_2 \cdot 6H_2O$, $Na_2HPO_4 \cdot 12H_2O$, $Na_2CO_3 \cdot 10H_2O$, $Na_2SO_4 \cdot 10H_2O$, $LiNO_2 \cdot 3H_2O$, and $CaCl_2 \cdot 6H_2O$, and the paraffin-based PCM, for example, may be at least one of $C_{12}H_{26}$, $C_{14}H_{30}$, $C_{16}H_{34}$, $C_{18}H_{38}$, $C_{19}H_{40}$, $C_{20}H_{42}$, $C_{21}H_{44}$, $C_{22}H_{46}$, $C_{24}H_{50}$, $C_{26}H_{54}$, $C_{27}H_{56}$, $C_{28}H_{58}$, and $C_{30}H_{62}$.

For reference, the battery cell may be a lithium ion battery cell or a lithium ion polymer battery cell, and the battery cell may include a positive electrode, a negative electrode, a separator, and a non-aqueous electrolyte solution containing a lithium salt.

The positive electrode is prepared, for example, by coating a mixture of a positive electrode active material, a conductive material, and a binder on a positive electrode current collector, and then drying the resultant. Alternatively, a filler may be further added to the mixture.

The positive active material may be a layered compound such as a lithium cobalt oxide ($LiCoO_2$), a lithium nickel oxide ($LiNiO_2$), and the like, or a compound substituted with one or more transition metals; a lithium manganese oxide such as $LiMnO_3$, $LiMn_2O_3$, and $LiMnO_2$ represented by a chemical formula $Li_{1+x}Mn_{2-x}O_4$ (where x is 0 to 0.33); a copper oxide such as lithium copper oxide ($Li_2CuO_2$); a vanadium oxide such as $LiV_3O_8$, $LiFe_3O_4$, $V_2O_5$, $Cu_2V_2O_7$, and the like; a Ni-site lithium nickel oxide represented by a chemical formula $LiNi_{1-x}M_xO_2$ (where M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or $Li_2Mn_3MO_8$ (where M=Fe, Co, Ni, Cu, or Zn); $LiMn_2O_4$ in which a part of Li in the formula is substituted with an alkaline earth metal ion; a disulfide compound; $Fe_2(MoO_4)_3$, and the like, but this is not restrictive.

The conductive material is usually added in an amount of 1% to 30% by weight based on the total weight of the mixture including the cathode active material. Such a conductive material is not particularly limited as long as it has electrical conductivity and does not cause a chemical change in the battery, and examples thereof include graphite such as natural graphite and artificial graphite; carbon compounds such as carbon black, acetylene black, Ketjen black, channel black, furnace black, lamp black, and summer black; conductive fibers such as carbon fiber and metal fiber; metal powders such as carbon fluoride, aluminum, and nickel powders; conductive whiskers such as zinc oxide and potassium titanate; conductive metal oxides such as titanium oxide; conductive materials such as polyphenylene derivatives; and the like can be used.

The binder is a component that assists in bonding between the active material and the conductive material and bonding to the current collector, and is typically added in an amount of 1 wt % to 30 wt % based on the total weight of the mixture containing the cathode active material. Examples of such binders include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene terpolymer (EPDM), sulfonated EPDM, styrene butylene rubber, fluorine rubber, various copolymers, and the like.

The filler is selectively used as a component for suppressing expansion of the positive electrode, and is not particularly limited as long as it is a fibrous material that does not cause a chemical change in the battery. Examples of the filler include olefin polymers such as polyethylene and polypropylene, fibrous materials such as glass fiber and carbon fiber, and the like.

The negative electrode is manufactured by applying and drying a negative active material on a negative current collector, and as necessary, the above-described components may be selectively further included.

Examples of the negative electrode active material include carbon such as hard carbon and graphite carbon; Al, B, P, Si, elements of Group 1 of the periodic table, $Li_xFe_2O_3$ (0≤X≤1), $Li_xWO_2$ (0≤X≤1), $Sn_xMe_{1-x}Me'_yO_z$ (Me:Mn, Fe, Pb, Ge, Me', Al, B, P, Si, elements of Groups 1, 2, and 3 of the periodic table, or a halogen; 0<x≤1; 1≤y≤3; 1≤z≤8); a metal complex oxide; lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; ILi—Co—Ni-based materials; and the like.

The separator is interposed between the positive electrode and the negative electrode, and an insulating thin film having high ion permeability and mechanical strength is used. A pore diameter of the separator is about 0.01 μm to 10 μm, and the thickness is about 5 μm to 300 μm. As the separator, for example, olefinic polymers such as polypropylene, which is chemically resistant and hydrophobic, or a sheet or a nonwoven fabric made of glass fiber, polyethylene, or the like, is used. When a solid electrolyte such as a polymer is used as an electrolyte, the solid electrolyte may also serve as a separator.

The nonaqueous electrolytic solution containing a lithium salt is formed of a polar organic electrolytic solution and a lithium salt. As the electrolytic solution, a non-aqueous liquid electrolyte, an organic solid electrolyte, an inorganic solid electrolyte, and the like are used.

As examples of the nonaqueous liquid electrolytic solution, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxyfuran, 2-methyltetrahydrofuran, dimethyl sulfoxide, 1,3-dioxolane, formamide, dimethylformamide, dioxolane, acetonitrile, nitromethane, methyl formate, methyl acetate, a phosphoric acid triester, trimethoxymethane, dioxolane derivatives, sulfolane, methyl sulfolane, 1,3-dimethyl-2-imidazolidinone, a propylene carbonate derivative, a tetrahydrofuran derivative, ether, methyl pyrophosphate, ethyl propionate, and the like can be used.

As examples of the organic solid electrolyte, for example, a polymer including a polyethylene derivative, a polyethylene oxide derivative, a polypropylene oxide derivative, a phosphate ester polymer, a polyagitation lysine, a polyester sulfide, a polyvinyl alcohol, a polyvinylidene fluoride, polymers containing ionic dissociation groups, and the like may be used.

As the inorganic solid electrolyte, for example, Li nitrides, Li halides, or Li sulfates such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$-$Li_2S$—$SiS_2$, and the like may be used.

The lithium salt is a substance which is soluble in the non-aqueous electrolyte, and for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, lower aliphatic carbonic acid lithium, 4 phenyl boric acid lithium, imide, and the like may be used.

In addition, for the purpose of improving the charge-discharge characteristics and the flame retardancy, non-aqueous liquid electrolytes include, for example, pyridine, triethylphosphite, triethanolamine, cyclic ether, ethylenediamine, n-glyme, hexaphosphoric triamide, benzene derivatives, sulfur, quinone imine dyes, N-substituted oxazolidinones, N, N-substituted imidazolidines, ethylene glycol dialkyl ethers, ammonium salts, pyrrole, 2-methoxyethanol, aluminum trichloride, and the like may be added. In some cases, a halogen-containing solvent such as carbon tetrachloride or ethylene trifluoride may be further added to impart inflammability, or carbon dioxide gas may be further added to improve high-temperature storage characteristics.

Advantageous Effects

The present invention also provides a battery pack including one or more battery cells, and provides a device using the battery pack as a power source.

The device may be one of a laptop computer, a netbook computer, a tablet computer, a mobile phone, an MP3, a wearable electronic device, a power tool, an electric vehicle (EV), a hybrid electric vehicle (HEV), a plug-in hybrid electric vehicle (PHEV), an electric bicycle, an electric scooter, an electric golf cart, or a power storage system, but is not limited thereto.

The structures of these devices and the manufacturing methods thereof are well known in the art, so a detailed description thereof will be omitted herein.

MODE FOR INVENTION

Hereinafter, an exemplary embodiment of the present invention is described with reference to the drawings, and is provided for easy understanding of the present invention, but the scope of the present invention is not limited thereto.

Figure 1:
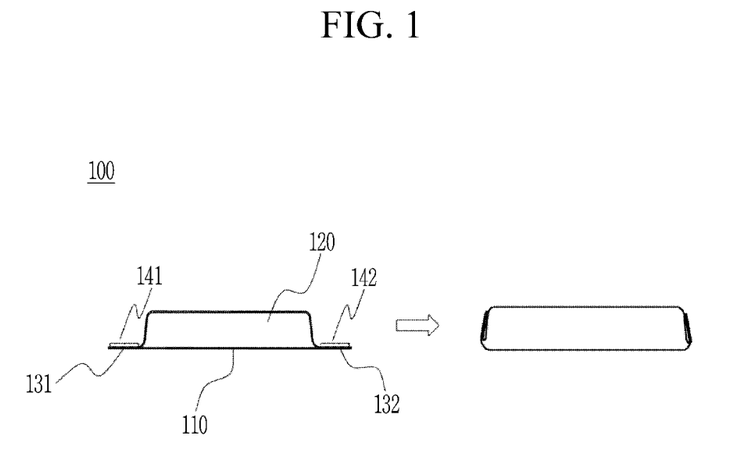
FIG. 1 illustrates a cross-sectional view of a structure in which a lateral sealing part is bent in a battery cell according to an exemplary embodiment of the present invention.
Figure 2:
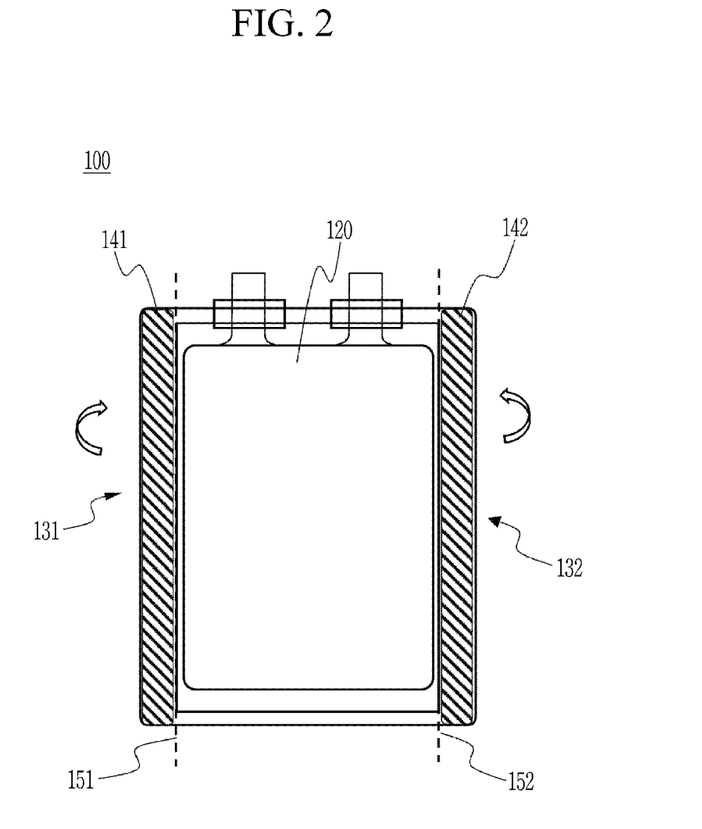
FIG. 2 illustrates a schematic view of a process in which a PCM is added to the lateral sealing part of the battery cell of FIG. 1.

FIG. 1 illustrates a cross-sectional view of a structure in which a lateral sealing part is bent in a battery cell according to an exemplary embodiment of the present invention, and FIG. 2 illustrates a schematic view of a process in which a PCM is added to the lateral sealing part of the battery cell of FIG. 1.

Referring to FIG. 1, in a battery cell 100 according to the present invention, an electrode assembly (not shown) having a structure in which a separator is interposed between an positive electrode and a negative electrode is installed in a receiving part 120 of a battery case 110, and an external side of the receiving part 120 is provided with lateral sealing parts 131 and 132 by heat fusion.

The lateral sealing parts 131 and 132 are formed to be in close contact with an outer surface of the receiving part 120 while being bent to the receiving part 120 of the battery case 110, and PCMs 141 and 142 that are phase-changed in response to a thermal change are coated on surfaces of the lateral sealing parts 131 and 132.

Referring to FIG. 2 together with FIG. 1, the lateral sealing parts 131 and 132 include bent parts 151 and 152 that are bent vertically upwardly at a position adjacent to the receiving part 120 while one of both surfaces of the battery cell 100 is parallel to the ground, and as a structure in which the PCMs 141 and 142 are coated on surfaces of the lateral sealing parts 131 and 132 forming inner bent surfaces by the bent parts 151 and 152, the PCMs 141 and 142 are coated before the bent parts 151 and 152 are formed, and then the battery cell 100 is completed to have a structure in which a portion adjacent to the receiving part 120 of the lateral sealing parts 131 and 132 is upwardly bent to closely contact an outer surface of the receiving part 120 of the battery case 110.

Figure 3:
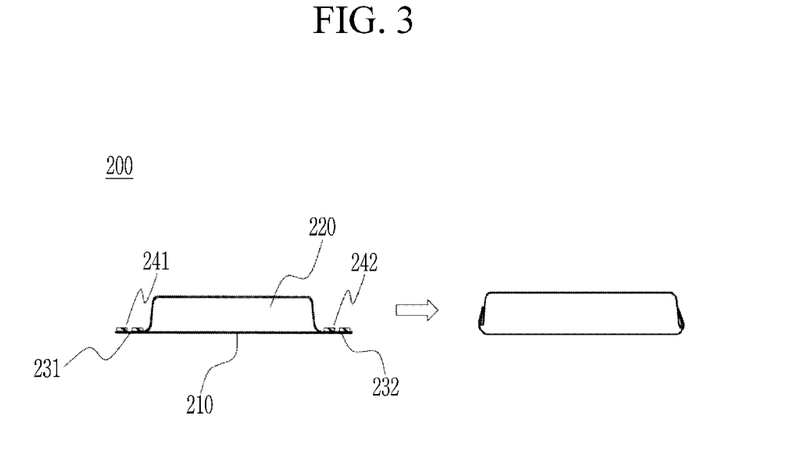
FIG. 3 illustrates a cross-sectional view of a structure in which a lateral sealing part is bent in a battery cell according to another exemplary embodiment of the present invention.
Figure 4:
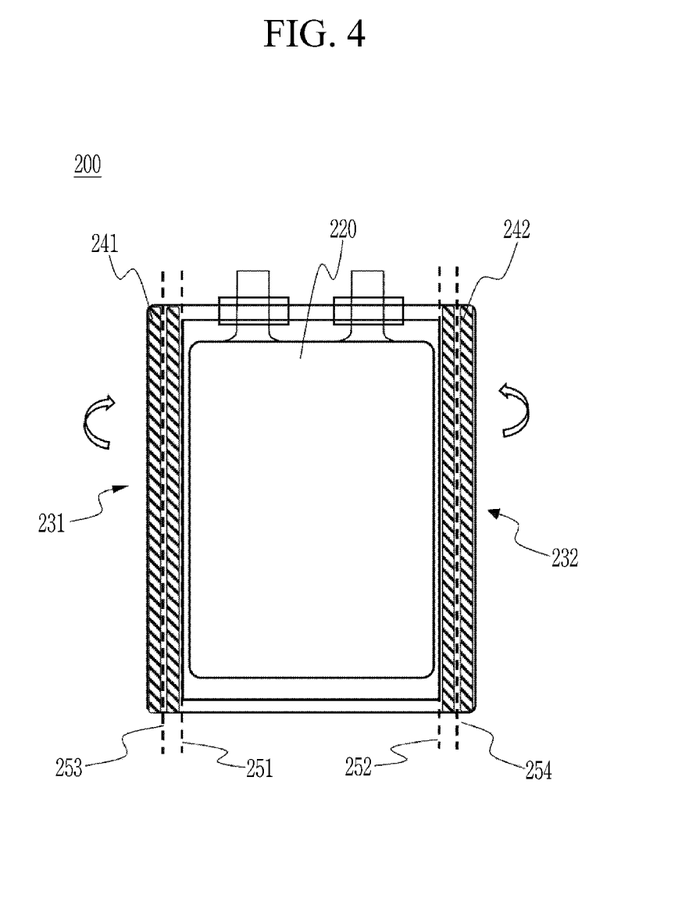
FIG. 4 illustrates a schematic view of a process in which a PCM is added to the lateral sealing part of the battery cell of FIG. 3.

FIG. 3 illustrates a cross-sectional view of a structure in which a lateral sealing part is bent in a battery cell according to another exemplary embodiment of the present invention, and FIG. 4 illustrates a schematic view of a process in which a PCM is added to the lateral sealing part of the battery cell of FIG. 3.

Referring to FIG. 3, in a battery cell 200, an electrode assembly (not shown) having a structure in which a separator is interposed between an positive electrode and a negative electrode is installed in a receiving part 220 of a battery case 210, and an external side of the receiving part 220 is provided with lateral sealing parts 231 and 232 by heat fusion.

In this case, the lateral sealing parts 231 and 232 are formed to be in close contact with an outer surface of the receiving part 220 while being bent to the receiving part 220 of the battery case 210, and PCMs 241 and 242 that are phase-changed in response to a thermal change are coated on surfaces of the lateral sealing parts 231 and 232.

Referring to FIG. 4 together with FIG. 3, the lateral sealing parts 231 and 232 include first bent parts 251 and 252 that are bent vertically upwardly at a position adjacent to the receiving part 220 and second bent parts 253 and 254 that are bent vertically downwardly at a position facing the first bent parts 251 and 252 while one of both surfaces of the battery cell 200 is parallel to the ground, and external end portions of the lateral sealing parts 231 and 232 are positioned between the bent lateral sealing parts 231 and 232 and the receiving part 220 to have a double-bent structure.

Specifically, the above-mentioned structure is a structure in which the PCMs 241 and 242 are coated on surfaces of the lateral sealing parts 231 and 232 forming an inner bent surface by the first bent parts 251 and 252 and the second bent parts 253 and 254, and according to the structure, the PCMs 241 and 242 are coated on surfaces of the lateral sealing parts 231 and 232 excluding bent portions of the first bent parts 251 and 252 and the second bent parts 253 and 254 before the first bent parts 251 and 252 and the second bent parts 253 and 254 are formed, and then an external end portion spaced apart from the receiving part 220 of the lateral sealing parts 231 and 232 is bent toward the receiving part 220 to form the second bent parts 253 and 254, and a portion adjacent to the receiving part 220 of the lateral sealing parts 231 and 232 is upwardly bent to form the first bent parts 251 and 252, thereby completing the battery cell 200.

Figure 5:
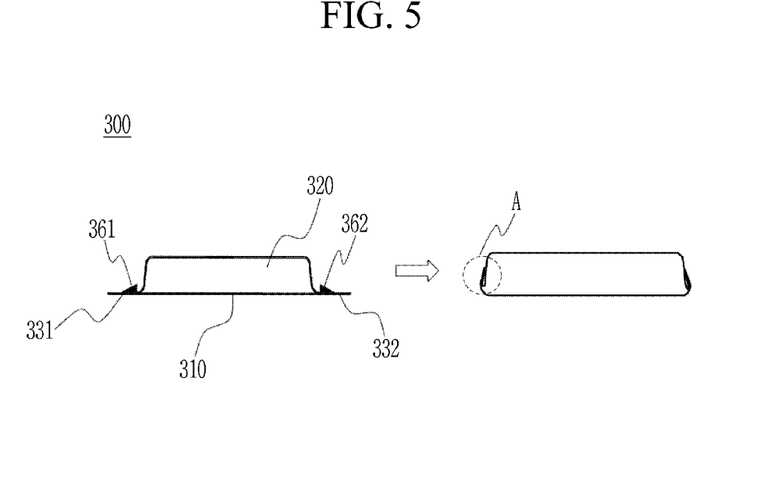
FIG. 5 illustrates a cross-sectional view of a structure in which a lateral sealing part is bent in a battery cell according to another exemplary embodiment of the present invention.
Figure 6:
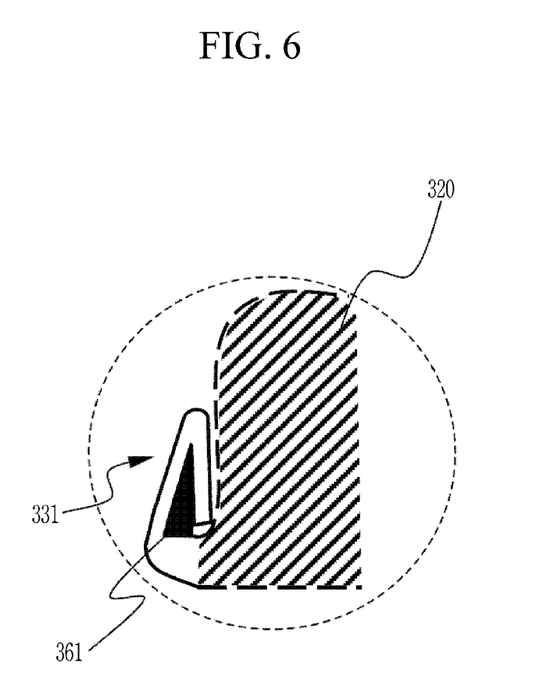
FIG. 6 illustrates an enlarged view of a portion "A" of the battery cell of FIG. 5.

FIG. 5 illustrates a cross-sectional view of a structure in which a lateral sealing part is bent in a battery cell according to another exemplary embodiment of the present invention, and FIG. 6 illustrates an enlarged view of a portion "A" of the battery cell of FIG. 5.

Referring to FIG. 5, similar to the structure described in FIG. 3, in a battery cell 300, an electrode assembly (not shown) having a structure in which a separator is interposed between a positive electrode and a negative electrode is installed in a receiving part 320 of a battery case 310, and an external side of the receiving part 320 is provided with lateral sealing parts 331 and 332 by heat fusion.

In this case, the lateral sealing parts 331 and 332 are formed to be in close contact with an outer surface of the receiving part 320 while being bent to the receiving part 320 of the battery case 310, and PCM members 361 and 362 are inserted between the receiving part 320 and the lateral sealing parts 331 and 332.

Referring to FIG. 6 together with FIG. 5, an external end portion of the lateral sealing parts 331 and 332 are positioned between the bent lateral sealing parts 331 and 332 and the receiving part 320 to have a double-bent structure, a bent surplus space is formed between the lateral sealing parts 331 and 332 and the receiving part 320 by the double-bent structure, and the PCM members 361 and 362 having a size corresponding to the bent surplus space are inserted into the bent surplus space.

Specifically, in the above-mentioned structure, a horizontal length of the bent surplus space formed by the double-bent structure may be substantially 0.3 mm to 1.0 mm depending on a size of the battery cell 300, a vertical length thereof may substantially be 0.5 mm to 1.5 mm, and horizontal and vertical lengths of each of the PCM members 361 and 362 may be substantially 0.3 mm to 1.0 mm and 0.5 mm to 1.5 mm, respectively.

The PCM members 361 and 362, before the bent surplus space is formed, may be added to the surfaces of the lateral sealing parts 331 and 332 while being fixed by an adhesive or an adhesive tape thereto, and it may be formed in various shapes according to a shape of the bent space such as a triangular shape or the like in a vertical section after being double-bent.

Accordingly, as shown in FIG. 1 to FIG. 6, by adding the phase change material that is phase-changed in response to a thermal change to the surfaces of the sealing parts in the battery cell or to the surplus space between the receiving part and the bent sealing parts, since it is possible to effectively suppress a sudden temperature change of the battery cell due to driving of a device and it is possible to control a temperature of the battery cell to an optimum operating temperature range of the battery cell under harsh conditions, cycle-life and safety of the battery cell may be improved.

It will be understood by those skilled in the art that various changes in form and details may be made therein without departing from the spirit and scope of the invention as defined by the appended claims.

As described above, according to the battery cell of the present invention, by adding the phase change material (PCM) that is phase-changed in response to a thermal change to the surfaces of the sealing parts in the battery cell or to the surplus space between the receiving part and the bent sealing parts, since it is possible to effectively suppress a sudden temperature change of the battery cell due to driving of a device and it is possible to control a temperature of the battery cell to an optimum operating temperature range of the battery cell under harsh conditions, cycle-life and safety of the battery cell may be improved.

The invention claimed is:

1. A battery cell of a plate shape, comprising:
   a battery case having a receiving part and sealing parts formed by heat fusion at an external side of the receiving part;
   wherein of the sealing parts, lateral sealing parts adjacent to one of the sealing parts at which an electrode terminal is positioned contact an outer surface of the receiving part while being bent toward the receiving part;
   an electrode assembly in which a separator is interposed between a positive electrode and a negative electrode, wherein the electrode assembly is mounted in the receiving part; and
   a phase change material (PCM) configured to be phase-changed in response to a thermal change and added to surplus surfaces of the lateral sealing parts,
   wherein each of the lateral sealing parts includes at least one bent part in which some of the lateral sealing part is bent to contact the outer surface of the receiving part,
   wherein each of the lateral sealing parts includes a first bent part vertically upwardly bent at a position adjacent to the receiving part and a second bent part vertically downwardly bent at a position facing the first bent part while one of both surfaces of the battery cell of the plate shape is parallel to the ground, and an external end portion of the lateral sealing part is positioned between the first bent part and the receiving part to have a double-bent structure, and
   wherein the PCM is coated on a surface of each of the lateral sealing parts forming an inner bent surface by the first bent part and the second bent part and excluding portions in which the first bent part and the second bent part are bent.

2. The battery cell of claim 1, wherein
   in a formation process of the double-bent structure, some of the external end portion spaced apart from the receiving part of the lateral sealing part is bent toward the receiving part to form the second bent part, and then some other of the external end portion adjacent to the receiving part of the lateral sealing part is bent to form the first bent part.

3. The battery cell of claim 1, wherein
   the PCM thermally contacts the receiving part of the battery cell that is charged or discharged to absorb at least some of heat generated from the battery cell, or to discharge at least some of heat accumulated in the PCM to the battery cell.

4. The battery cell of claim 1, wherein
   the PCM is at least one of an organic material-based PCM, an inorganic material-based PCM, and a paraffin-based PCM.

5. A battery pack including the battery cell of claim 1.

6. A device comprising the battery pack of claim 5 as a power source.

7. A battery cell of a plate shape, comprising:
   a battery case having a receiving part and sealing parts formed by heat fusion at an external side of the receiving part;
   wherein of the sealing parts, lateral sealing parts adjacent to one of the sealing parts at which an electrode terminal is positioned contact an outer surface of the receiving part while being bent toward the receiving part;

an electrode assembly in which a separator is interposed between a positive electrode and a negative electrode, wherein the electrode assembly is mounted in the receiving part; and a phase change material (PCM) configured to be phase-changed in response to a thermal change and added to surplus spaces between the receiving part and the bent lateral sealing parts, wherein each of the lateral sealing parts includes at least one bent part in which some of the lateral sealing part is bent to contact the outer surface of the receiving part, wherein each of the lateral sealing parts includes a first bent part vertically upwardly bent at a position adjacent to the receiving part and a second bent part vertically downwardly bent at a position facing the first bent part while one of both surfaces of the battery cell of the plate shape is parallel to the ground, and an external end portion of the lateral sealing part is positioned between the first bent part and the receiving part to have a double-bent structure, and wherein the surplus spaces are formed at each of the lateral sealing parts by the double-bent structure, and the PCM is a solid member having a size corresponding to the surplus space and inserted into the surplus space, and wherein the surplus space or PCM member has a triangular shape on a vertical section.

8. The battery cell of claim 7, wherein in a formation process of the double-bent structure, some of the external end portion spaced apart from the receiving part of the lateral sealing part is bent toward the receiving part to form the second bent part, and then some other of the external end portion adjacent to the receiving part of the lateral sealing part is bent to form the first bent part.

9. The battery cell of claim 7, wherein the PCM member is fixed to the surplus space by an adhesive or an adhesive tape.

10. The battery cell of claim 7, wherein a horizontal length of the surplus space or PCM member is in a range of 0.3 mm to 1.0 mm, and a vertical length thereof is in a range of 0.5 mm to 1.5 mm.

11. The battery cell of claim 10, wherein a horizontal length of the surplus space or PCM member is 0.3 mm, and a vertical length thereof is 1.0 mm.

12. The battery cell of claim 7, wherein the PCM thermally contacts the receiving part of the battery cell that is charged or discharged to absorb at least some of heat generated from the battery cell, or to discharge at least some of heat accumulated in the PCM to the battery cell.

13. The battery cell of claim 7, wherein the PCM is at least one of an organic material-based PCM, an inorganic material-based PCM, and a paraffin-based PCM.

14. A battery pack including the battery cell of claim 7.

15. A device comprising the battery pack of claim 14 as a power source.

* * * * *